United States Patent
Morinaga et al.

(10) Patent No.: US 7,406,095 B2
(45) Date of Patent: Jul. 29, 2008

(54) DATA PROCESSING APPARATUS AND METHOD WITH PACKET PARSING

(75) Inventors: Takeo Morinaga, Kanagawa (JP); Iwao Yamamoto, Tokyo (JP); Hajime Inoue, Chiba (JP); Ichiro Hamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 746 days.

(21) Appl. No.: 10/902,544

(22) Filed: Jul. 29, 2004

(65) Prior Publication Data

US 2005/0025186 A1    Feb. 3, 2005

Related U.S. Application Data

(63) Continuation of application No. 09/670,443, filed on Sep. 26, 2000, now Pat. No. 6,792,000.

(30) Foreign Application Priority Data

Sep. 27, 1999    (JP) .................................. 11-272051

(51) Int. Cl.
*H04J 3/16* (2006.01)
*H04J 3/04* (2006.01)
*H04N 7/08* (2006.01)

(52) U.S. Cl. .................. 370/465; 370/535; 386/92; 386/98; 386/124

(58) Field of Classification Search ............... None
See application file for complete search history.

(56) References Cited

U.S. PATENT DOCUMENTS

| 5,920,572 A * | 7/1999 | Washington et al. ........ 370/535 |
| 6,477,317 B1 * | 11/2002 | Itokawa .................... 386/95 |
| 6,813,283 B2 * | 11/2004 | Takashimizu et al. ...... 370/535 |
| 7,027,718 B1 * | 4/2006 | Ohishi et al. ............... 386/98 |

* cited by examiner

*Primary Examiner*—Wing F. Chan
*Assistant Examiner*—Gregory B Sefcheck
(74) *Attorney, Agent, or Firm*—Frommer Lawrence & Haug LLP; William S. Frommer

(57) ABSTRACT

A transport stream (TS) is recorded and the recorded TS is reproduced simultaneously. An input PID parser extracts the first packet only to be recorded, the second packet to be recorded and to be used for controlling, and the third packet to be used only for controlling from among the TS packet that constitutes the TS supplied from a descrambler. The first and second packets are supplied to a receiver and supplied to a hard disk drive (HDD) for recording. The second and third packets are supplied to an MUX. On the other hand, the TS packet stored in the HDD is read out and supplied to the MUX by way of an output PID parser. The MUX multiplexes the second or third packet supplied from the input PID parser and the TS packet read out from the HDD, and supplies the multiplexed packet to a CPU that controls a descrambler or the like.

28 Claims, 9 Drawing Sheets

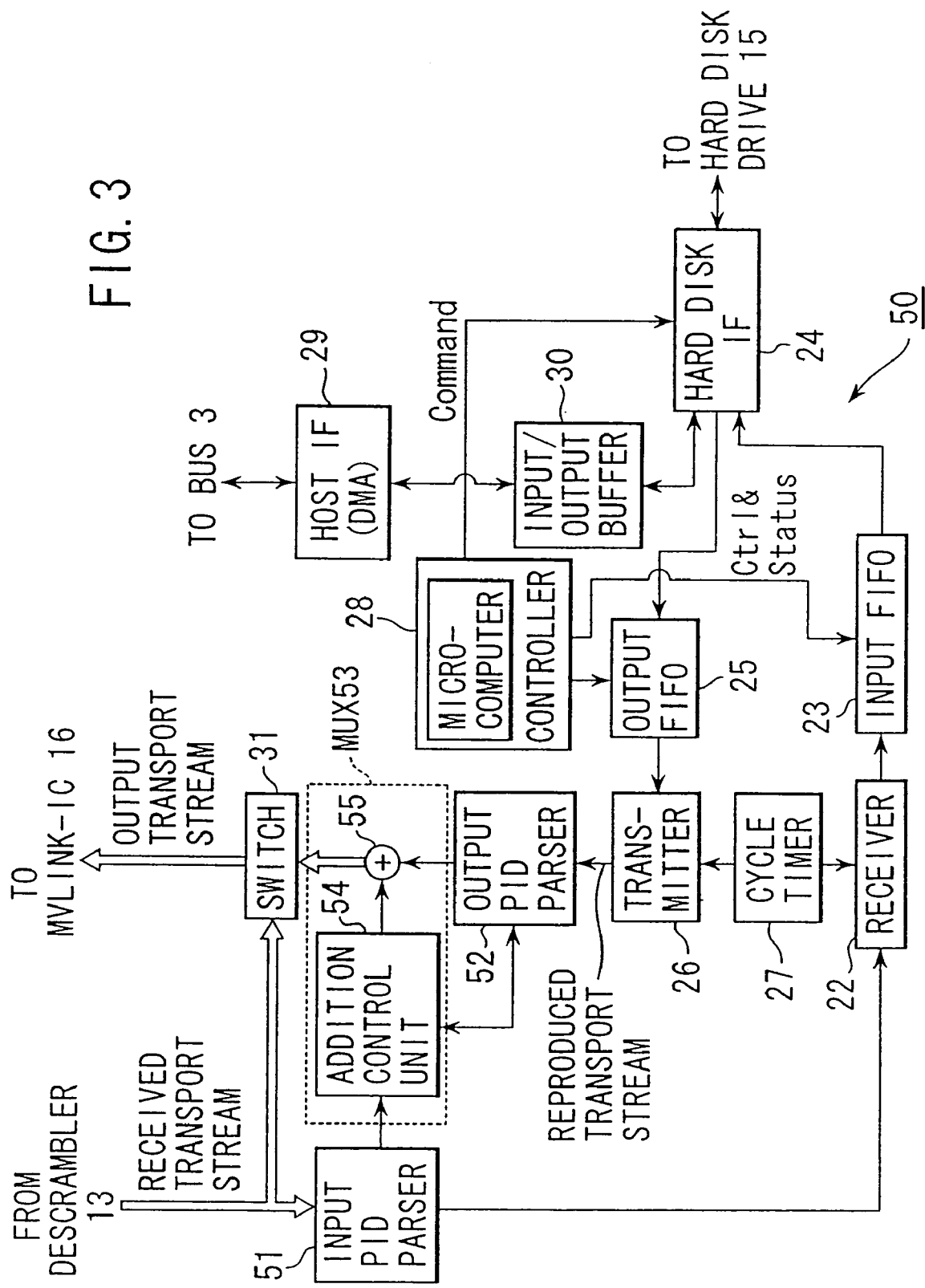

| PACKET TYPE | SWITCH 62 | SWITCH 63 |
|---|---|---|
| DISCARDING PACKET | OFF | OFF |
| RECORDING PACKET | ON | OFF |
| RECORDING/CONTROLLING PACKET | ON | ON |
| CONTROLLING PACKET | OFF | ON |

| PACKET TYPE | SWITCH 72 |
|---|---|
| DISCARDING PACKET | OFF |
| REPRODUCING PACKET | ON |

RECEIVED TRANSPORT STREAM

TS PACKET TO BE RECORDED

DISCARDING PACKET

RECORDING PACKET

RECORDING/CONTROLLING PACKET

CONTROLLING PACKET

REPRODUCED TRANSPORT STREAM

TS PACKET SUPPLIED FROM OUTPUT PID PARSER TO MUX

TS PACKET SUPPLIED FROM MUX (OUTPUT TRANSPORT STREAM)

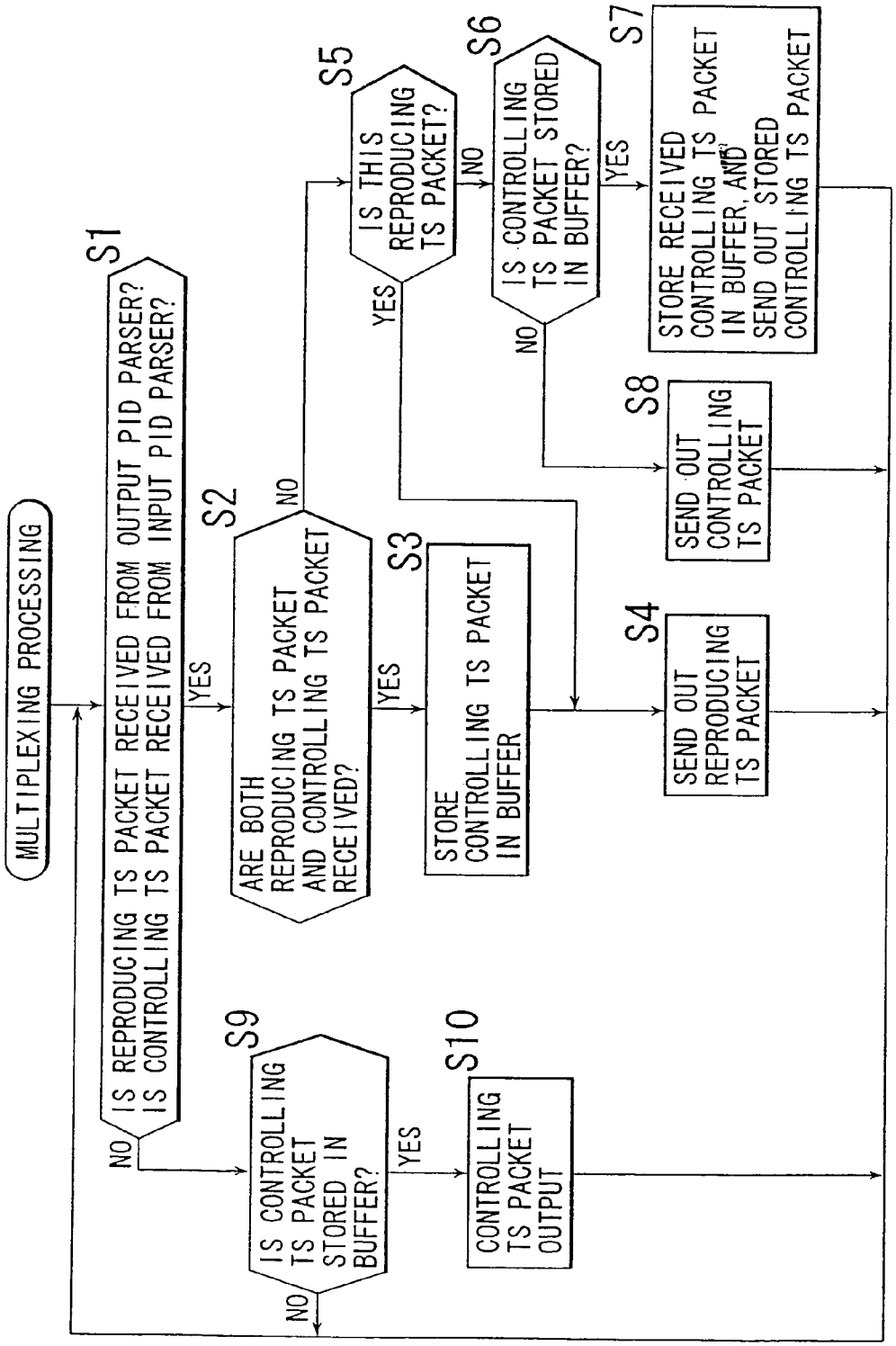

DATA PROCESSING APPARATUS AND METHOD WITH PACKET PARSING

This application is a continuation of 09/670,443, filed Sep. 26, 2000, now U.S. Pat. No. 6,792,000, which is incorporated herein by reference.

BACKGROUND OF THE INVENTION

1. Field of the Invention

This invention relates to a data processing apparatus and a data processing method, and a recording medium, and more particularly relates to a data processing apparatus and a data processing method, and a recording medium that are capable of simultaneous recording and reproducing of a digital satellite broadcast program.

2. Description of Related Art

Recently, the digital satellite broadcasting has been started practically, and various digital satellite broadcast receiving apparatus have been commercialized.

However, no digital satellite broadcast receiving apparatus having a built-in storage device such as a hard disk or the like for recording a digital satellite broadcast program has not yet been commercialized at present time.

Furthermore, in the commercialization of such digital satellite broadcast receiving apparatus, it would be likely needed in the future that such a digital satellite broadcast receiving apparatus is provided with a simultaneous recording and reproducing function like so-called delayed playback that is a function for reproducing a digital satellite broadcast program recorded in a storage device while the received digital satellite broadcast program is being recorded in the storage device.

SUMMARY OF THE INVENTION

The present invention has been accomplished in view of the above, for example, the digital data such as the recorded digital satellite program or the like is reproduced while the digital data is being recorded by applying the present invention.

A data processing apparatus of the present invention comprises packet extracting means at least for extracting a first packet only to be recorded, a second packet to be recorded and to be used for controlling, and a third packet to be used only for controlling from among component packets of the received stream, packet output means for supplying the first and second packets to a recording unit for recording the data, and multiplexing means for multiplexing the second and third packets and a packet reproduced from the recording unit and for sending out the multiplexed packet.

The stream composed of packets of the predetermined format may be a transport stream. In this case, converting means, that converts the PID of any one of the second or third packet and the packet reproduced from the recording unit in the case that the PID (Packet Identification) of the second or third packet is identical with the PID of the packet reproduced from the recording unit, is additionally provided.

When the multiplexing means receives the second or third packet and the packet reproduced from the recording unit simultaneously, the multiplexing means temporarily stores the second or third packet and sends out the packet reproduced from the recording unit, and sends out the stored second or third packet when the packet reproduced from the recording unit is not received.

A recording unit may be provided additionally.

A data processing method of the present invention comprises a packet extracting step at least for extracting the first packet only to be recorded, a second packet to be recorded and to be used for controlling, and a third packet to be used only for controlling from among component packets of the received stream, a packet output step of supplying the first and second packets to a recording unit for recording the data, and a multiplexing step of multiplexing the second and third packets and a packet reproduced from the recording unit and for sending out the multiplexed packet.

A recording medium of the present invention characterized by containing a recorded program comprises a packet extracting step at least of extracting a first packet only to be recorded, a second packet to be recorded and to be used for controlling, and a third packet to be used only for controlling from among component packets of the received stream, a packet output step of supplying the first and second packets to a recording unit for recording the data, and a multiplexing step of multiplexing the second and third packets and a packet reproduced from the recording unit and for sending out the multiplexed packet.

In the data processing apparatus and the data processing method, and the recording medium of the present invention, at least a first packet only to be recorded, a second packet to be recorded and to be used for controlling, and a third packet to be used only for controlling are extracted from among packets that constitute the received stream. The first and second packets are supplied to the recording unit for recording the data, and the second and third packets and a packet reproduced from the recording unit are multiplexed and sent out.

BRIEF DESCRIPTION OF THE DRAWINGS

FIG. 3 is a block diagram for illustrating an exemplary structure of a hard disk control unit 50 shown in FIG. 2.

FIG. 7 is a flow chart for describing the processing of an MUX 53 shown in FIG. 3.

DETAILED DESCRIPTION OF THE PREFERRED EMBODIMENTS

Figure 1:
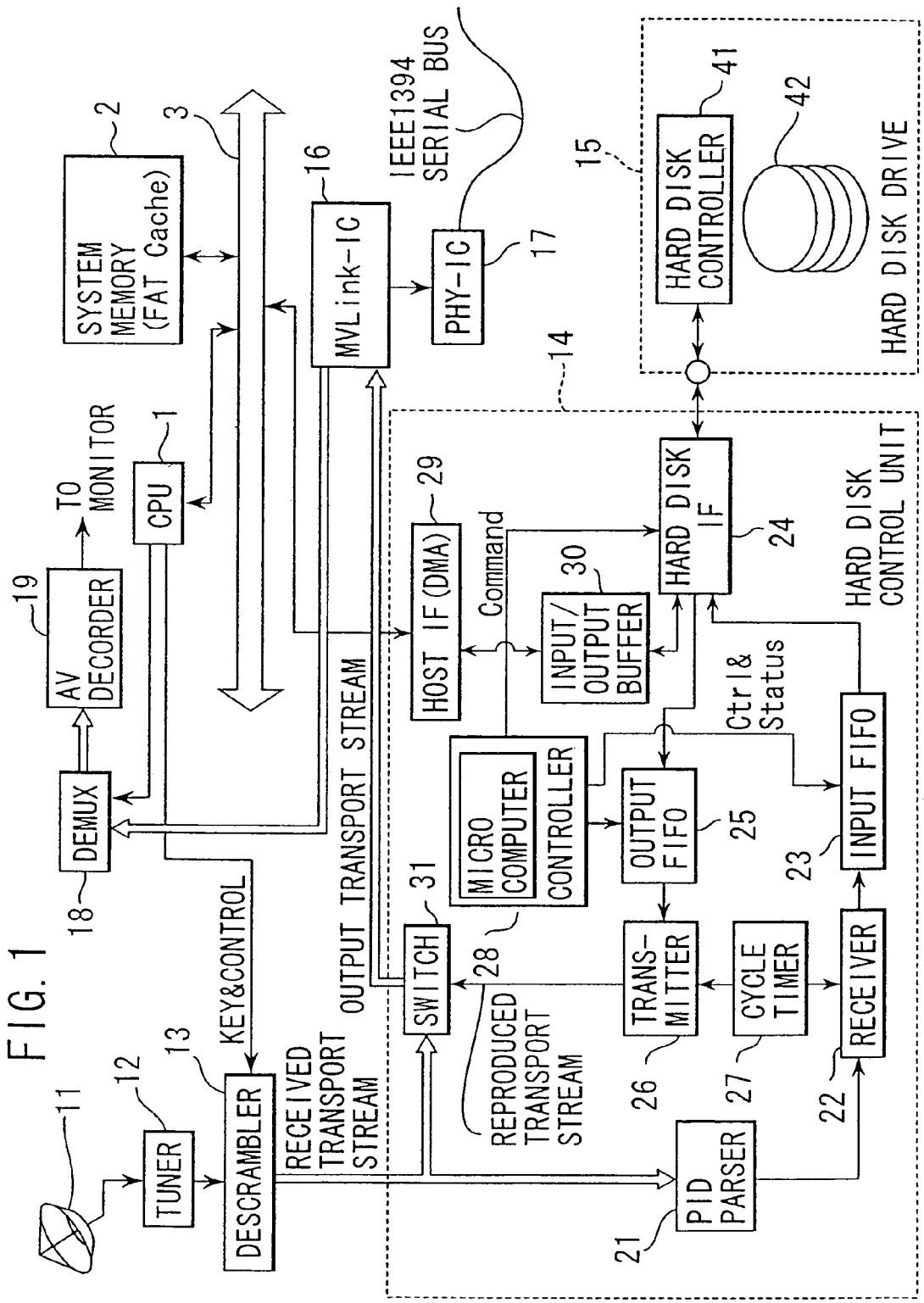
FIG. 1 is a block diagram for illustrating an exemplary structure of a digital satellite broadcast receiving apparatus having a built-in hard disk drive 15.

FIG. 1 shows an exemplary structure of a digital satellite broadcast receiving apparatus having a built-in hard disk drive 15 served as a storage device for receiving the digital satellite broadcast.

The digital satellite broadcast receiving apparatus receives a transport stream as the digital satellite broadcast program from a broadcasting station not shown in the drawing and displays the image and sound as the transport stream thereof, and furthermore reproduces the recorded transport stream that has been recorded.

In detail, an antenna 11 receives the digital satellite broadcast wave, and the received signal is supplied to a tuner 12. The tuner 12 decodes the signal received from the antenna 11 to obtain the transport stream, and supplies it to a descrambler 13. The descrambler 13 descrambles the scrambled transport stream supplied from the tuner 12 by use of a decoding key supplied from a CPU1 under the control by means of the CPU1, and supplies it to a hard disk control unit 14.

The transport stream supplied from the descrambler 13 (referred to as received transport stream hereinafter properly) is supplied to a PID (Packet Identification) parser 21 and a switch 31. In addition to the received transport stream, the transport stream reproduced by means of the hard disk drive 15 is supplied to the switch 31 by way of a transmitter 26.

When the received transport stream is to be reproduced, the switch 31 selects the received transport stream from among two transports supplied thereto (the received transport stream and the transport stream supplied from the transmitter 26) and supplies it to an MVLink-IC (MVLink-IC (MPEG (Moving Picture Experts Group) Link Integrated Circuit) 16.

The MVLink-IC 16 subjects the link layer processing in the layer structure of IEEE (Institute of Electrical and Electronics Engineers) 1394 serial bus to the output transport stream, and supplies it to a PHY-IC 17. Otherwise, the MVLink-IC 16 supplies the output transport stream to a DEMUX (demultiplexer) 18.

Herein, the PHY-IC 17 performs the link layer processing in the layer structure of the IEEE 1394 serial bus, and when the PHY-IC 17 receives the output transport stream from the MVLink-IC 16, the PHY-IC 17 isochronously transfers the output transport stream to an IEEE 1394 apparatus not shown in the drawing by way of the IEEE 1394 serial bus.

The DEMUX 18, having a microcomputer and memory or the like that are not shown in the drawing, separates the TS packet on which the section data (the control data used for controlling the decoding key for descrambling the scrambled PAT (Program Association Table), PMT (Program Map Table), and transport stream and others) are loaded from the transport packet that constitutes the output transport stream (referred to as TS packet hereinafter properly) supplied from the MVLink-IC 16, and furthermore analyzes the content thereof, and supplies the necessary control data to the CPU 1.

As described hereinabove, the CPU 1 supplies the decoding key out of the section key supplied from the DEMUX 18 to the descrambler 13, and controls the descrambler 13 based on other section data supplied from the DEMUX 18.

The DEMUX 18 not only separates the TS packet on which the control data is loaded from the output transport stream but also separates the packet on which the video data and the audio data (referred to as AV data including both data hereinafter properly) of the selected program are loaded, and the DEMUX 18 supplies the AV data to an AV decoder 19.

The AV decoder 19 MPEG (Moving Picture Experts Group) 2-decodes the TS packet supplied from the DEMUX 18 and supplies the resultant AV data to a monitor not shown in the drawing. Thereby, the image and sound of the digital satellite broadcast program are reproduced (displayed) on the monitor.

On the other hand, in the case that the received transport stream is to be recorded, the switch 31 also selects the received transport stream from among two input transport streams (the received transport stream and the transport stream supplied from the transmitter 26), and supplies it to the DEMUX 18 by way of the MVLink-IC 16 as the output transport stream.

As described hereinabove, the DEMUX 18 separates the TS packet on which the control data is loaded from the output transport stream, then separates the necessary data loaded on the TS, and supplies it to the CPU 1. The CPU 1 controls the descrambler 13 based on the control data. Thereby, the descrambler 13 descrambles the transport stream containing the TS packet that is to be recorded.

The received transport stream is also supplied to the PID parser 21 as described hereinabove, and the PID parser 21 supplies only the TS packet of the program that is to be recorded to a receiver 22 with reference to the PID of the TS packet that constitutes the received transport stream supplied thereto (residual TS packet is discarded). The receiver 22 adds the time stamp based on the clock generated by means of the cycle timer 27 to the TS packet supplied from the PID parser 21, and supplies it to an input FIFO (First In First Out) 23. In other words, the cycle timer 27 supplies the clock having a predetermined frequency to the receiver 22 and transmitter 26, and the receiver 22 adds the time stamp that is synchronous with the clock generated by means of the cycle timer 27 to the TS packet supplied from the PID parser 21 and supplies it to the input FIFO 23. The input FIFO 23 stores the TS packet supplied from the receiver successively, and supplies the stored TS packet in FIFO-fashion to a hard disk IF (Interface) 24 according to the control by means of a controller 28.

The controller 28 having a built-in microcomputer monitors the storage status in the input FIFO 23 or an output FIFO 25, and controls data reading/writing in the input FIFO 23 and the output FIFO 25. Furthermore, the controller 28 controls the hard disk IF 24.

Upon receiving the TS packet from input FIFO 23, the hard disk IF 24 supplies the TS packet to the hard disk drive 15.

In the hard disk drive 15, the TS packet is received by means of a hard disk controller 41 and recorded in a hard disk 42.

Next, in the case that the TS packet recorded in the hard disk 42 as described hereinabove is to be reproduced, the hard disk controller 41 reads out the transport stream that is served as the sequence of the TS packet recorded in the hard disk 42 (referred to as reproduced transport stream hereinafter properly) and supplies it to the hard disk control unit 14.

In the hard disk control unit 14, the hard disk IF 24 receives the reproduced transport stream and supplies it to the output FIFO 25. The output FIFO 25 stores the TS packet that constitutes the reproduced transport stream supplied from the hard disk IF 24 successively, and sends out the stored TS packet in the order of FIFO-fashion to the transmitter 26 according to the control by means of the controller 28. The transmitter 26 supplies the reproduced transport stream that is served as the sequence of the TS packet supplied from the output FIFO 25 to the switch 31 synchronously with the clock supplied from the cycle timer 27. In other words, when the transport stream that is served as the sequence of the TS packet generated by means of the PID parser 21 is recorded in the hard disk drive 15, the time interval between TS packets that constitute the transport stream could be irregular. To solve the problem, the transmitter 26 supplies the TS packet to the switch 31 at the timing so as to restore the time interval between TS packets to the original time interval with reference to the time stamp added to the TS packet.

When the TS packet recorded in the hard disk 42 is reproduced, the switch 31 selects the reproduced transport stream supplied from the transmitter 26, and supplies it to the MVLink-IC 16 as the output transport stream. Thereafter, the reproduced transport stream that is served as the output transport stream is isochronously transferred on the IEEE 1394 serial bus by way of the PHY IC 17 as in the case of processing of the received transport stream, or supplied to the monitor by way of the DEMUX 18 and decoder 19.

The CPU 1 that is connected to the bus 3 reads out and executes the program stored in the system memory 2 that is connected to the same bus 3 to thereby control the descrambler 13 and perform various other processing. The system memory 2 stores various programs for the CPU 1 to perform various processing.

Furthermore, a host IF 29 that is a component of the hard disk control unit 14 functions as an interface for communicating with the CPU 1 by way of the bus 3. The host IF 29 and an input/output buffer 30 provided between the host IF 29 and the above-mentioned hard disk IF 24 temporarily store the data that is communicated between them.

As described hereinabove, the CPU 1 takes an access to the had disc drive 15 by way of the bus 3, host IF 29, input/output buffer 30, and hard disk IF 24. Thereby, the CPU 1 records the data in the form of file in the hard disk drive 15 and reads out the data in the form of file recorded in the hard disk drive 15.

The digital satellite broadcast receiving apparatus having the structure as described in FIG. 1 cannot function to perform simultaneous recording and reproducing unlike so-called delayed playback in which the received transport stream is recorded by means of the hard disk drive 15 while the recorded transport stream is being reproduced.

In other words, as described hereinabove, the switch 31 of the hard disk control unit 14 selects the received transport stream supplied from the descrambler 13 and sends it out as the output transport stream when the received transport stream is to be recorded, and on the other hand selects the reproduced transport stream supplied from the transmitter 26 and sends it out as the output transport stream when the transport stream stored in the hard disk drive 15 is to be reproduced.

Though it is required for switch 31 to select the reproduced transport stream supplied from the transmitter 26 consistently in order to reproduce the transport stream recorded in the hard disk drive 15, in this case the switch 31 cannot select the received transport stream supplied from the descrambler 13 as an output transport stream and cannot supply it to the DEMUX 18 by way of the MVLink-IC 16. As the result, the CPU 1 cannot obtain a decoding key used by means of the descrambler 13, and the descrambler 13 cannot descramble the transport stream.

Furthermore, in this case, because the control data loaded on the TS packet that constitutes the received transport stream is not supplied at all to the CPU 1, the CPU 1 cannot get the information or the like necessary for knowing the status of the digital satellite broadcast in real time, various problems likely occur.

Figure 2:
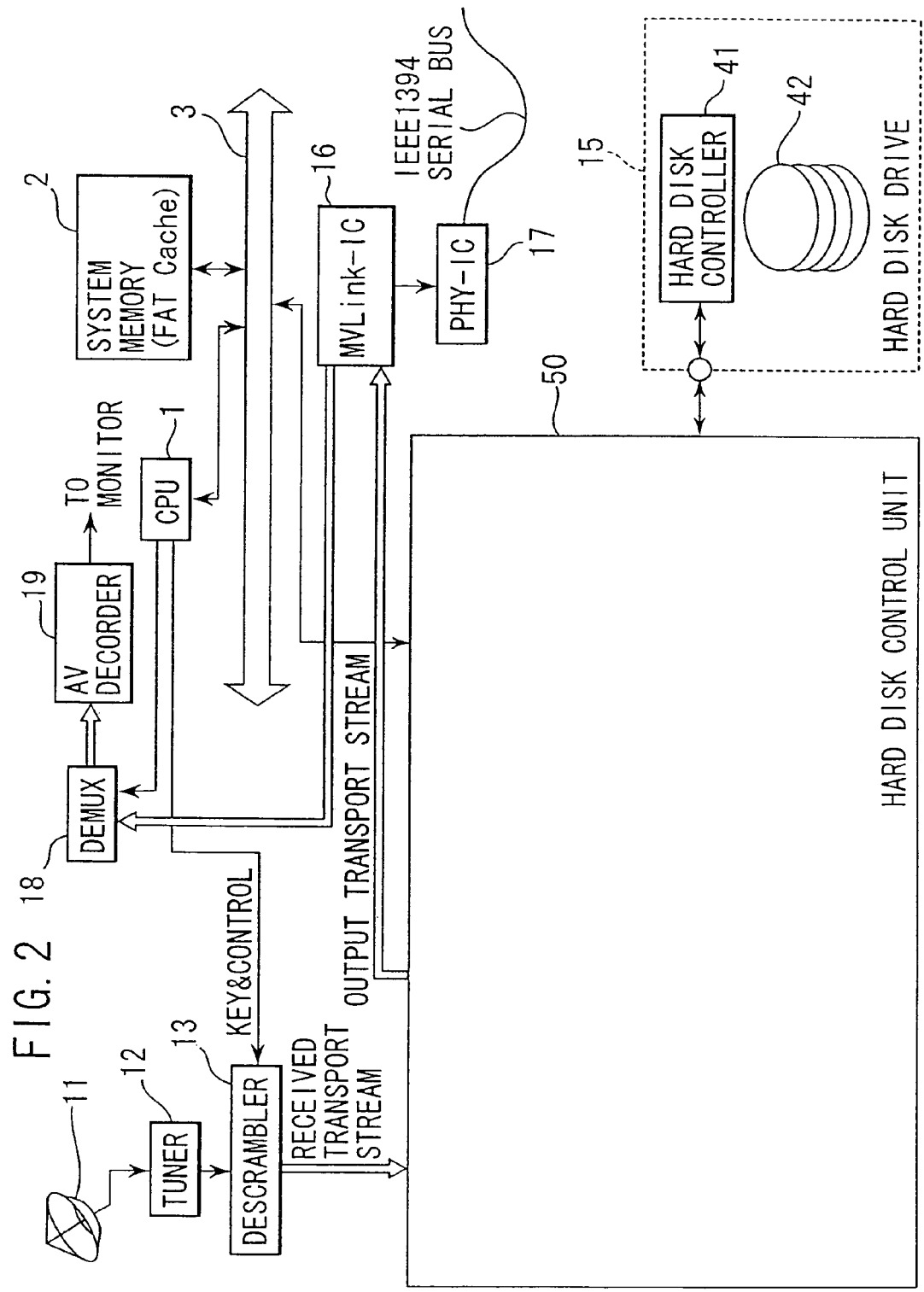
FIG. 2 is a block diagram for illustrating an exemplary structure of one embodiment of a digital satellite broadcast receiving apparatus to which the present invention is applied.

In view of the above problem, an exemplary structure of an embodiment of a digital satellite broadcast receiving apparatus to which the present invention is applied is shown in FIG. 2. In FIG. 2, the components corresponding to those shown in FIG. 1 are given the same characters, and the description is omitted hereinafter. In detail, the digital satellite broadcast receiving apparatus shown in FIG. 2 has the same structure as that of the digital satellite broadcast receiving apparatus shown in FIG. 1 excepting that a hard disk control unit 50 is provided instead of the hard disk control unit 14 shown in FIG. 1.

FIG. 3 shows an exemplary structure of the hard disk control unit 50 shown in FIG. 2. In FIG. 3, the same components corresponding to those of the hard disk control unit 14 shown in FIG. 1 are given the same characters, and the description is omitted hereinafter. The hard disk control unit 50 has the same structure as that of the hard disk control unit 14 shown in FIG. 1 excepting that the hard disk control unit 50 is provided additionally with an input PID parser 51, an output PID parser 52, and an MUX (multiplexer) 53, and the PID parser 21 is eliminated.

The received transport stream supplied from the descrambler 13 is supplied to the switch 31 and the input PID parser 51. From the TS packet that constitutes the received transport stream supplied from the descrambler 13, the input PID parser 51 extracts the TS packet to be only recorded (referred to as recording packet hereinafter properly), the TS packet to be recorded and to be used for controlling (referred to as recording/controlling packet hereinafter properly), the TS packet to be used for only control (referred to as controlling packet herein after properly), and the TS packet to be discarded (referred to as discarding packet hereinafter properly), and supplies the recording packet and the recording/controlling packet to the receiver 22 and supplies the controlling packet to the MUX 53. Furthermore, the input PID parser 51 discards the discarding packet.

The output PID parser 52 receives the reproduced transport stream that has been reproduced by means of the hard disk drive 15 and has been supplied from the transmitter 26, and extracts the TS packet to be reproduced-(referred to as reproducing packet hereinafter properly) and the TS packet to be discarded (discarding packet) from among the TS packets that constitute the reproduced transport stream. Furthermore, the output PID parser 52 supplies the reproducing TS packet to the MUX 53 and discards the discarding packet.

Furthermore, the output PID parser 52 communicates with an addition control unit 54, which will be described hereinafter, of the MUX 53 to thereby detects the reproducing TS packet having the same PID as that of TS packet supplied to the MUX 53 from the input PID parser 51, and convert the PID of the reproducing TS packet to a different PID.

The MUX 53 comprising the addition control unit 54 and a gate circuit 55 multiplexes the TS packet supplied from the input PID parser 51 and the TS packet supplied from the output PID parser 52, and supplies them to the switch 31. In detail, the addition control unit 54 shifts the output timing of the TS packet that the addition control unit 54 itself is going to send out when the timing of output of the TS packet from the input PID parser 51 to the gate circuit 55 coincides with the timing of output of the TS packet from the output PID parser 52 to the gate circuit 55. Thereby, collision between the TS packet sent out from the input PID parser 51 itself and the TS packet sent out from the output PID parser 52 on the gate circuit 55 is prevented. The gate circuit 55 merely transfers the TS packet supplied from the addition control unit 54 and the TS packet supplied from the output PID parser 52 to the switch 31.

Next, the detail of the input PID parser 51 shown in FIG. 3 will be described with reference to FIG. 4A and FIG. 4B.

Figures 4A, 4B:
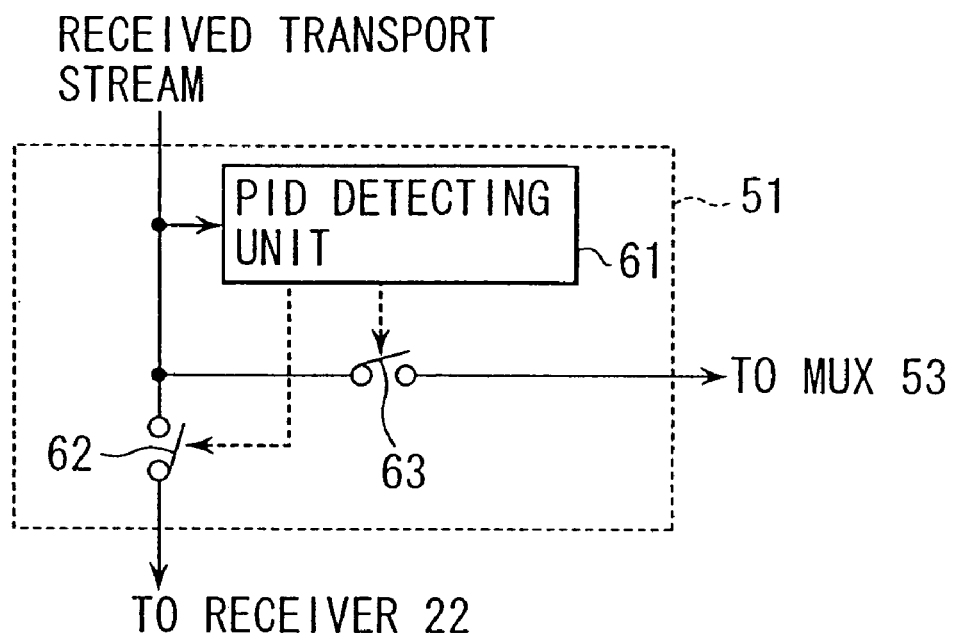
FIG. 4A and FIG. 4B are diagrams for describing the detail of an input PID parser 51 shown in FIG. 3.

FIG. 4A shows an exemplary structure of the input PID parser 51.

As shown in FIG. 4A, the input PID parser 51 comprises a PID detecting unit 61 and switches 62 and 63.

The PID detecting unit 61 detects the PID of the TS packet that constitutes the received transport stream supplied from the descrambler 13, and controls the switches 62 and 63 based on the detection result.

The switch 62 is turned ON/OFF under the control by means of the PID detecting unit 61 to thereby control the supply of the TS packet that constitutes the received transport stream to the receiver 22. The switch 63 is also turned ON/OFF under the control by means of the PID detecting unit 61 to thereby control the supply of the TS packet that constitutes the received transport stream to the MUX 53.

The input PID parser 51 having the structure as described hereinabove supplies the TS packet that constitutes the received transport stream supplied from the descrambler 13 to the PID detecting unit 61 and the switches 62 and 63.

The PID detecting unit 61 detects the PID of the TS packet supplied thereto and recognizes whether the TS packet is the TS packet on which the AV data to be recorded is loaded, the TS packet on which the control data necessary to reproduce the AV data is loaded, the TS packet on which the control data necessary to descramble the transport stream supplied from the tuner 12 is loaded, or the TS packet that does not correspond to any one of the above TS packets.

If the TS packet corresponds to the TS packet on which the AV data to be recorded is loaded, then the PID detecting unit 61 controls the switches 62 and 63 on the assumption that the TS packet is a recording packet. If the TS packet corresponds to the TS packet on which the control data necessary to reproduce the AV data is loaded, then the PID detecting unit 61 controls the switches 62 and 63 on the assumption that the TS packet is a recording/controlling packet. If the TS packet correspond to the TS packet on which the control data necessary to descramble the transport stream supplied from the tuner is loaded, then the PID detecting unit 61 controls the switches 62 and 63 on the assumption that the TS packet is a controlling packet. If the TS packet corresponds to the TS packet that does not corresponds to any one of the above-mentioned TS packets, then the PID detecting unit 61 controls the switches 62 and 63 on the assumption that the TS packet is a discarding packet.

In other words, the PID detecting unit 61 controls the switches 62 and 63 as shown in FIG. 4B.

In detail, in the case that the TS packet is a discarding packet, the switches 62 and 63 are both turned OFF, and as the result the TS packet is supplies neither to the receiver nor to the MUX 5.3 and discarded. In the case that the TS packet is a recording packet, the switch 62 or 63 is turned ON or OFF, and as the result the TS packet is supplied only to the receiver 22. Furthermore, in the case that the TS packet is a recording/controlling packet, the switches 62 and 63 are both turned ON, and as the result the TS packet is supplied both to the receiver 22 and the MUX 53. Furthermore, in the case that the TS packet is a recording packet, the switch 62 or 63 is turned OFF or ON, and as the result the TS packet is supplied only to the MUX 53.

As described hereinabove, the discarding packet is discarded, and the recording packet is recorded in the hard disk drive 15. Furthermore, the recording/controlling packet is recorded in the hard disk drive 15 and supplied to the MUX 53, and the controlling packet is supplied to the MUX 53.

Next, the detail of the output PID parser 52 shown in FIG. 3 will be described with reference to FIG. 5A and FIG. 5B.

Figures 5A, 5B:
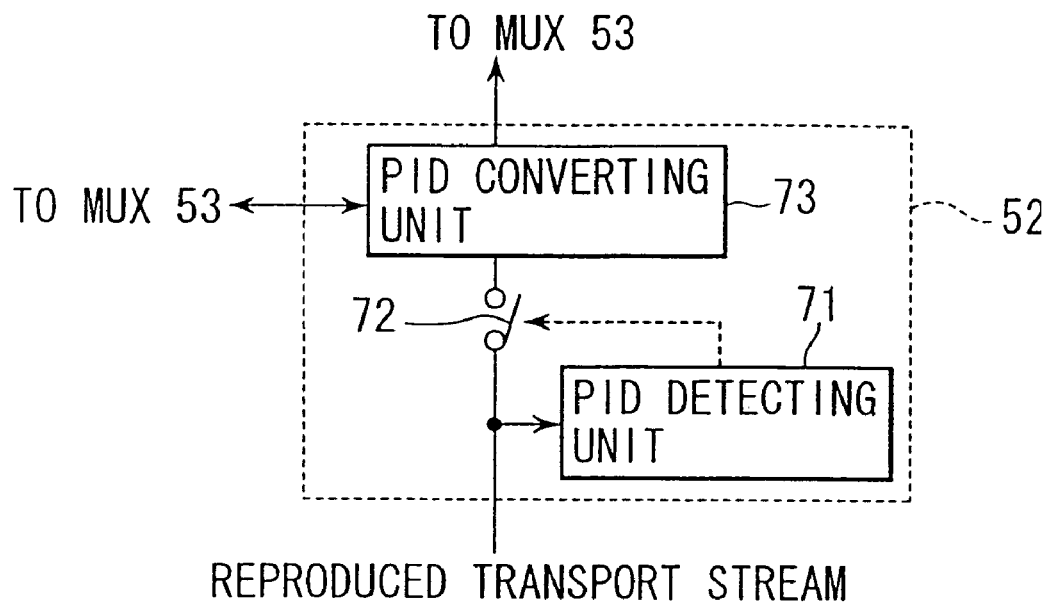
FIG. 5A and FIG. 5B are diagrams for describing the detail of an output PID parser 52 shown in FIG. 3.

FIG. 5A shows an exemplary structure of the output PID parser 52.

As shown in FIG. 5A, the output PID parser 52 comprises a PID detecting unit 71, a switch 72, and a PID converting unit 73.

The PID detecting unit 71 detects the PID of the TS packet that constitutes the reproduced transport stream supplied from the transmitter 26 and controls the switch 72 based on the detection result like the PID detecting unit 61 shown in FIG. 4A and FIG. 4B.

The switch 72 is turned ON/OFF under the control by means of the PID detecting unit 71 to thereby control the supply of the TS packet that constitutes the reproduced transport stream to the PID converting unit 73.

The PID converting unit 73 communicates with the MUX 53, converts the PID of the TS packet to be supplied by way of the switch 72 as required, and supplies the TS packet to the MUX 53.

The output PID parser 52 having the structure as described hereinabove supplies the TS packet that constitutes the reproduced transport stream supplied from the transmitter 26 to the PID detecting unit 71 and the switch 72.

The PID detecting unit 71 detects the PID of the TS packet supplied thereto, and recognizes whether the TS packet is the TS packet to be reproduced or the TS packet that is not necessary to be reproduced based on the PID.

If the TS packet corresponds to the TS packet to be reproduced, then the PID detecting unit 71 controls the switch 72 on the assumption that the TS packet is a reproducing packet, on the other hand if the TS packet corresponds to the TS packet that is not necessary to be reproduced, then the PID detecting unit 71 controls the switch 72 on the assumption that the TS packet is a discarding packet.

In detail, the PID detecting unit 71 controls the switch 72 as shown in FIG. 5B.

Therefore, if the TS packet is a discarding packet, then the switch 72 is turned OFF, and as the result the TS packet is discarded without being supplied to the PID converting unit 73. On the other hand, if the TS packet is a reproducing packet, then the switch 72 is turned ON, and as the result the TS packet is supplied to the PID converting unit 73.

Upon receiving the TS packet (reproducing packet) by way of the switch 72, the PID converting unit 73 supplies the TS packet to the gate circuit 55 of the MUX 53. However, the PID converting unit 73 communicates with the addition control unit 54 of the MUX 52, and if the TS packet that is to be supplied to the gate circuit 55 of the MUX 52 from the PID converting unit 73 itself has the same PID as that of the TS packet that the addition control unit of the MUX 53 is going to supply to the gate circuit 55, then the PID converting unit 73 converts the PID of the TS packet that is to be supplied from the PID converting unit 73 itself to a different PID, and supplies the TS packet having the converted PID to the gate circuit 55.

Because the PID is converted even though it is the TS packet that is to be broadcasted in the same channel excepting the special TS packet (for example, the TS packet on which PAT is loaded), the same PID can be allocated both to the TS packet supplied from the input PID parser 61 to the MUX 53 and the TS packet supplied from the output PID parser 52 to the MUX 53 though different data is loaded on both TS packets. In this case, the different data is loaded in the DEMUX 18, it can be difficult to analyze the TS packet to which the same PID is allocated. To solve such problem, the PID converting unit 73 converts the PID of the TS packet that is to be sent out from the PID converting unit 73 itself to a PID different from the PID of the TS packet that is to be sent out from the addition control unit 54 if the TS packet that is to be sent out from the PID converting unit 73 itself to the gate circuit 55 of the MUX 52 is identical with the PID of the TS packet that is to be sent out from the addition control unit 54 of the MUX 53 to the gate circuit 55.

Next, when the digital satellite broadcast receiving apparatus shown in FIG. 2 receives the transport stream served as the digital satellite broadcast program and displays the image and sound served as the transport stream, the same processing as that performed by means of the digital satellite broadcast receiving apparatus shown in FIG. 1 is performed.

In detail, the antenna 11 received the digital satellite broadcast wave, the obtained received signal is supplied to the tuner 12, and the tuner 12 demodulates the received signal supplied from the antenna 11 to obtain the transport stream, and the transport stream is supplied to the descrambler 13. The descrambler 13 descrambles the scrambled transport stream supplied from the tuner 12 by use of a decoding key supplied from the CPU 1, and supplies it to the hard disk control unit 50.

The transport stream supplied from the descrambler 13 (received transport stream) is supplied to the input PID parser 51 and the switch 31 of the hard disk control unit 50 (FIG. 3). In this case, the switch 31 selects the received transport stream supplied from the descrambler 13, and supplies it to the MVLink-IC 16 as the output transport stream.

Subsequently, the output transport stream is isochronously transferred on the IEEE 1394 serial bus by way of the PHY-IC 17 or supplied to the monitor by way of the DEMUX 18 and the decoder 19 as in the case shown in FIG. 1.

In this case, because the received transport stream is supplied to the DEMUX 18 as the output transport stream, the DEMUX 18 obtains the necessary control data from the received transport stream and supplies it to the CPU 1. Therefore, the descrambler 13 can descramble the transport stream supplied from the tuner 12.

Next, when the received transport stream is to be recorded, the switch 31 selects the received transport stream supplied from the descrambler 13, and supplies it to the DEMUX 18 by way of the MVLink-IC 16 as the output transport stream. Therefore, also in this case, the DEMUX 18 obtains the necessary control data from the received transport stream supplied as the output transport stream and can supply it to the CPU 1, and as the result the descrambler 13 can descramble the transport stream supplied from the tuner 12.

Furthermore, in this case, the input PID parser 51 supplies only the TS packet of the program that is to be recorded (the above-mentioned recording packet and the recording/controlling packet) and discards the residual TS packet with referring to the PID of the TS packet that constitutes the received transport stream supplied thereto. Subsequently the same processing as performed in the case shown in FIG. 1 is performed, and the TS packet supplied from the input PID parser 51 to the receiver 22 is recorded in the hard disk drive 15.

Next, when the TS packet recorded in the hard disk drive 15 as described hereinabove is to be reproduced, the TS packet recorded in the hard disk drive 15 is reproduced as in the case shown in FIG. 1, and the reproduced transport stream obtained as the result is supplied from the transmitter 26 to the output PID parser 52.

The output PID parser 52 supplies only the TS packet to be reproduced (the above-mentioned reproducing packet) to the MUX 53 with referring to the PID of the TS packet that constitutes the reproduced transport stream supplied thereto, and discards the residual TS packet.

The MUX 53 supplies the TS packet supplied from the output PID parser 52 to the gate circuit 55. Furthermore, in this case, because only reproduction of the TS packet recorded in the hard disk drive 15 is performed, the TS packet is not supplied from the input PID parser 51 to the gate circuit 55 by way of the addition control unit 54. Therefore, the gate circuit 55 allows the TS packet to be supplied from the output PID parser 52 to the switch circuit 31 successively.

Subsequently, in the same manner as shown in FIG. 1, the TS packet recorded in the hard disk drive 15 is isochronously transferred on the IEEE 1394 serial bus by way of the PHY-IC 17 or supplied to the monitor by way of the DEMUX 18 and the decoder 19.

Next, the processing performed when the digital satellite broadcast receiving apparatus shown in FIG. 2 reproduces the transport stream recorded already in the hard disk drive 15 while the received transport stream is being recorded in the hard disk drive 15 will be described with reference to FIG. 6.

Figure 6A:
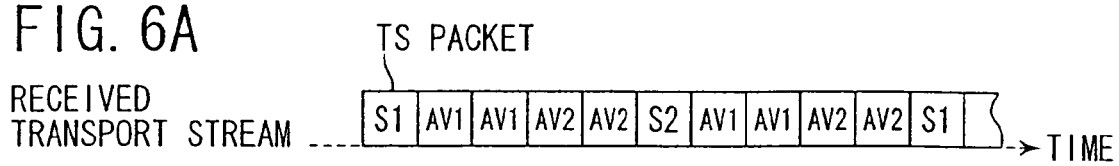
FIG. 6A to FIG. 6I are time charts for describing the processing performed when the transport stream is recorded and reproduced simultaneously in the digital satellite broadcast receiving apparatus shown in FIG. 2.

For example, it is assumed that the transport stream composed of sequential TS packets as shown in FIG. 6A is supplied from the descrambler 13 to the hard disk control unit 50 as the received transport stream.

In FIG. 6A to FIG. 6I, a square having S and a numeral represents a TS packet on which the control data is loaded, and a square having AV and a numeral represents a TS packet on which the AV data is loaded.

In the received transport stream shown in FIG. 6A, it is assumed that the control data S1 loaded on a TS packet #S1 (a TS packet on which the data S1 is loaded) contains the information necessary for reproducing the AV data AV1 loaded on a TS packet #AV1 (for example, PMT on which PID of the TS packet #AV1 or the like), and furthermore, for example, the control data S2 loaded on a TS packet #S2 contains a decoding key for descrambling the transport stream (payload of the TS packet) in the descrambler 13.

Figure 6B:

In this case, it is assumed that the AV data AV1 is the AV data of the program to be recorded, then it i's necessary to record TS packets #S1, #AV1 shown in FIG. 6B out of the TS packets that are components of the received transport stream shown in FIG. 6A. In other words, it is necessary to record not only the AV data AV1 that is to be recorded but also the control data S1 that is necessary for reproducing.

Furthermore, it is necessary to supply the TS packet #S2 to the CPU1 in order to descramble the transport stream by means of the descrambler 13.

Figure 6C:
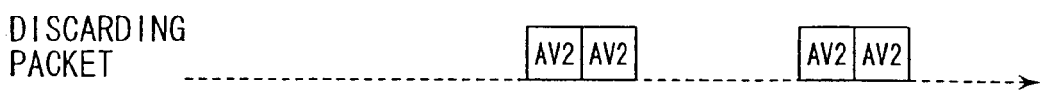

Accordingly, TS packets #AV2 on which the AV data AV2 is loaded is unnecessary out of the TS packets that are components of the received transport stream shown in FIG. 6A and these TS packets is to be discarded as shown in FIG. 6C. When the input PID parser 51 (FIG. 4A and FIG. 4B) receives a TS packet AV2 by means of the PID detecting unit 61, the switches 62 and 63 are both turned OFF as described hereinabove and the TS packet AV2 is thereby discarded.

Figure 6D:

Furthermore, a TS packet #AV1 on which the AV data AV1 to be recorded is loaded is the recording packet that is only to be recorded, the switches 62 or 63 is turned ON or OFF at the timing when a TS packet is received as shown in FIG. 6D in the PID detecting unit 61 of the input PID parser 51, and the TS packet AV1 is thereby supplied to the receiver 22 and recorded in the hard disk driver 15.

Figure 6E:

It is necessary to record the control data S1 such as PMT or the like loaded on a TS packet #S1 that is to be recorded because the control data S1 is necessary for reproducing the AV data AV1, and also it is necessary to supply the control data S1 to the CPU 1 in order to recognize the data loaded on the TS packet based on the PID of the TS packet by means of the DEMUX 18 or the like. Therefore, the TS packet #S1 is recorded and also served as the recording/controlling packet used by the CPU 1 for controlling. In the PID detecting unit 61 of the input PID parser 51 (shown in FIG. 4A and FIG. 4B) the switches 62 and 63 are both turned ON at the timing when a TS packet #S1 is received as shown in FIG. 6E, the TS packet #S1 is thereby supplied to the receiver 22 and recorded in the hard disk drive 15, and supplied to the MUX 53 and subsequently supplied to the CPU 1 as described hereinafter.

Figure 6F:
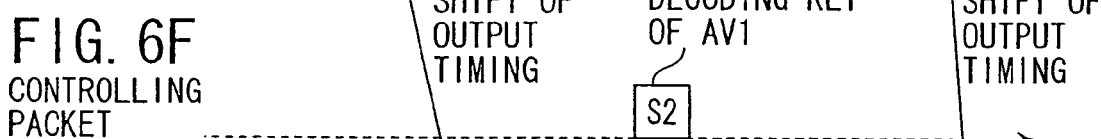

Because the control data S2 such as a decoding key or the like loaded on a TS packet #S2 is necessary for the descrambler 13 to descramble but not necessary to reproduce the AV data AV1 to be recorded, the TS packet #S2 is the controlling packet used only for controlling. In the PID detecting unit 61 of the input PID parser 51 (FIG. 4A and FIG. 4B), the switches 62 or 63 is turned OFF or ON at the timing when a TS packet #S2 is received as shown in FIG. 6F as described hereinabove, and the TS packet #S2 is supplied to the MUX 53 and subsequently supplied to the CPU 1 as described hereinafter.

Figure 6G:
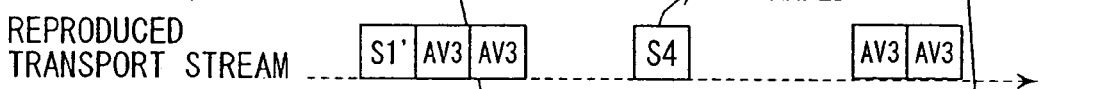

On the other hand, it is assumed that the hard disk drive 15 reads out the recorded TS packets, and the reproduced transport stream that is sequential TS packets, for example, as shown in FIG. 6G is thereby supplied from the transmitter 26 to the output PID parser 52.

In the reproduced transport stream shown in FIG. 6G, it is assumed that the AV data loaded on a TS packet #AV3 is the AV data that is required to be reproduced, and the control data S1' loaded on a TS packet #S1' is the information necessary to reproduce the AV data AV3 loaded on the TS packet #AV3 (for example, PMT that describes the PID of a TS packet #AV3 or the like). Furthermore, it is assumed that the control data S4 loaded on a TS packet #S4 is unnecessary to reproduce the AV data AV3.

Figure 6H:
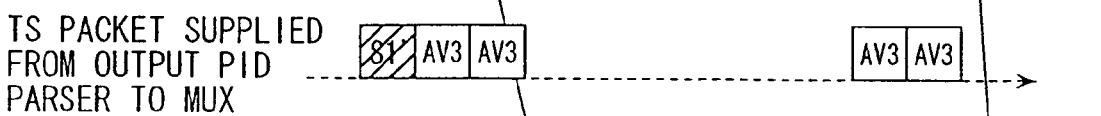

In this case, in the PID detecting unit 71 of the output PID parser 52 (FIG. 5A and FIG. 5B), the switch 72 is turned OFF at the timing when a TS packet #S4 is received as described hereinabove, and the TS packet #S4 is thereby discarded. Furthermore, in the PID detecting unit 71, the switch 72 is turned ON at the timing when a TS packet #S1' and TS packet #AV3 are received, and the TS packets #S1' and AV3 are thereby supplied from the output PID parser 52 to the MUX 53 as shown in FIG. 6H.

As described hereinabove, the TS packet S1 is supplied from the input PID parser 51 to the MUX 53 (FIG. 6E), at that time if the PID of the TS packet #S1 is identical with the PID of the TS packet #S1' supplied from the output PID parser 52 to the MUX 53, then the PID converting unit 73 of the output PID parser 52 (FIG. 5A and FIG. 5B) converts the PID of the TS packet #S1' as described hereinabove and thereafter supplies it to the MUX 53. The shading in FIG. 6H and FIG. 6I on the TS packets #S1' means that the PID of the TS packets #S1' shown in FIG. 6G has been changed.

The MUX 52 supplies the TS packet supplied from the output PID parser 52 to the switch 31 by way of the operator 55.

Furthermore, the MUX 53 receives the TS packet from the output PID parser 52, and receives the TA packets #S1 and #S2 from the input PID parser 51 as shown in FIG. 6E and FIG. 6F. Out of these TS packets, the timing when the TS packet #S1 is supplied from the input PID parser 51 overlaps with the timing when the output PID parser 52 sends out the TS packet #S1' as shown in FIG. 6H. Therefore, the TS packet #S1 sent out from the input PID parser 51 will collide with the TS packet #S1' sent out from the output PID parser 52 at the gate circuit 55 in the MUX 53 if the TS packet #S1 sent out from the input PID parser 51 and the TS packet #S1' sent out from the output PID parser 52 are supplied to the gate circuit 55 as they are.

To avoid such problem, if the timing when the input PID parser 51 sends out the TS packet to the gate circuit 55 overlaps with the timing when the output PID parser 52 sends out the TS packet to the gate circuit 55, the addition control unit 54 of the MUX 53 shifts the output timing of the TS packet that is to be sent out by itself to thereby prevent the collision between the TS packet sent out by itself and the TS packet sent out from the output PID parser 52 at the gate circuit 55.

Figure 6I:
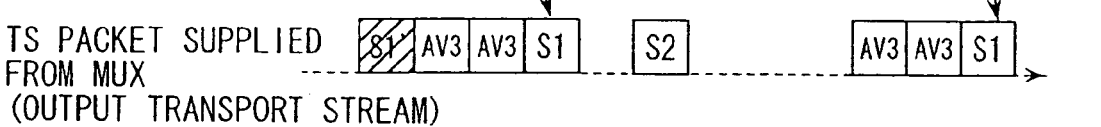

In detail, in this case, the addition control unit 54 temporarily stores the TS packet #S1 supplied from the input PID parser 51, and sends out the stored TS packet S1 to the gate circuit 55 in a free time space when the TS packet is not sent out from the output PID parser 52 after the TS packet sent out from the output PID parser 52 passes through the gate circuit 55 as shown in FIG. 6I. Thereby, the timing of the TS packer #S1 is shifted so that the TS packet #S1 does not collide with the TS packet sent out from the output PID parser 52, and the TS packet #S1 is allowed to pass through the gate circuit 55. As shown in FIG. 6F, because the timing when the TS packet #S2 supplied from the input PID parser 51 is supplied to the MUX 53 does not overlap with the timing when the TS packet supplied from the output PID parser 52 is supplied to the MUX 53, the TS packet is sent out to the gate circuit 55 and the switch 31 without shifting of the timing.

The addition control unit 54 recognizes the free time space when the TS packet is not supplied from the output PID parser 52 to the gate circuit 55. In detail, the addition control unit 54 communicates with the output PID parser 52 to thereby obtain the time stamp that is added to the TS packet to be sent out from the output PID parser 52, and calculates the difference between the time stamp of the newest TS packet sent out from the output PID parser 52 and the time stamp of the TS packet that is to be sent out next to thereby recognize the free time space.

As described hereinabove, the MUX 53 supplies the transport stream that is sequential TS packets as shown in FIG. 6I to the switch 31.

In the case that the received transport stream is recorded and the transport stream recorded in the hard disk drive 15 is reproduced simultaneously, the switch 31 supplies the transport stream that is sequential TS packets supplied from the MUX 53 to the MVLink-IC 16 as the output transport stream, as the result the transport stream (FIG. 6I) is isochronously transferred on the IEEE 1394 serial bus by way of the PHY-IC 17, or sent out to the monitor by way of the DEMUX 18 and decoder 19.

Therefore, because the control data S1' necessary to reproduce the AV data AV3 is supplied to the CPU 1 by way of the DEMUX 18, the AV data AV3 is reproduced normally.

Furthermore, the control data S2 such as decoding key or the like used for descrambling is also supplied to the CPU 1 by way of the DEMUX 18, as the result the descrambler 13 can descramble the transport stream supplied from the tuner 12.

Furthermore, the control data S1 such as PMT or the like is supplied to the CPU 1 by way of the DEMUX 18 and the CPU 1 can thereby obtain the information or the like for knowing the status of the digital satellite broadcast in real time, and as the result occurrence of various problems is prevented.

As described hereinabove, in the digital satellite broadcast receiving apparatus, the received transport stream is recorded and the transport stream recorded in the hard disk drive 15 is reproduced simultaneously. As the result, for example, it is possible to perform the delayed playback, that is, while the received transport stream is being recorded in the hard disk drive 15, the recorded transport stream is reproduced immediately. A user does not view the received transport stream as it is but can view the transport stream that is generated by recording temporarily and thereafter reproducing the received transport stream, in other words the user can view the time axis shifted received transport stream.

In the digital satellite broadcast apparatus shown in FIG. 1, a DEMUX having the same function as the DEMUX 18 is provided between the descrambler 13 and the PID parser 21, and the DEMUX distributes the TS packet required to constitute the received transport stream to the DEMUX 18 and the PID parser 21. Thereby, it is possible to perform simultaneous recording and reproduction of the transport stream as in the case of the digital satellite broadcast receiving apparatus shown in FIG. 2. However, because the DEMUX 18 has the built-in CPU and memory or the like as described hereinabove, it is very expensive. Furthermore, because the DEMUX 18 is a component that is served for the complex processing such as analysis of the data loaded on the TS packet or the like, the additional DEMUX having the same function as that of the DEMUX 18 leads to a high cost and complex apparatus as a whole. On the other hand, the digital satellite broadcast receiving apparatus shown in FIG. 2 is inexpensive in the cost and simple in the structure in comparison with the apparatus having the additional DEMUX.

Next, the processing in the MUX 53 shown in FIG. 3 performed when the transport stream is recorded and reproduced simultaneously will be described hereinafter with reference to a flow chart shown in FIG. 7.

In the MUX 53, at first in step S1, whether the TS packet supplied from the output PID parser 52 (referred to as reproduced TS packet hereinafter properly) is received or the TS packet supplied from the input PID parser 51 (referred to as control TS packet hereinafter properly) is received is determined.

If whether the reproduced TS packet supplied from the input PID parser 52 is received or the control TS packet supplied from the input PID parser 51 is received is determined in step S1, then the sequence proceeds to step S2, and whether both reproduced TS packet and control TS packet are received or not in the MUX 53 is determined.

If it is determined that both the reproduced TS packet and the control TS packet are received in step S2, then the sequence proceeds to step S3, the addition control unit 54 stores the control TS packet supplied from the input PID parser 51 in the built-in buffer (not shown in the drawing), and the sequence proceeds to step S4. The gate circuit 55 supplies the reproduced TS packet supplied from the output PID parser 52 to the switch 31 in step S4, and the sequence returns to step S1.

On the other hand, if it is determined that both the reproduced TS packet and the control TS packet are not received in step S2, in other words, if it is determined that any one of the reproduced TS packet and the control TS packet is received, the sequence proceeds to step S5, and whether the received packet is either the reproduced TS packet supplied from the output PID parser 52 or the control TS packet supplied from the input PID parser 51 is determined in the MUX 53. If it is determined that the received packet is the reproduced TS packet supplied from the output PID parser 52 in step S5, then the sequence proceeds to step S4, and the gate circuit 55 supplies the reproduced TS packet supplied from the output PID parser 52 to the switch 31 as described hereinabove, and the sequence returns to step S1.

On the other hand, if it is determined that the received packet is the control TS packet supplied from the input PID parser 51 in step S5, then the sequence proceeds to step S6, and whether the control TS packet is stored in the built-in buffer of the addition control unit 54 or not is determined. If it is determined that the control TS packet is stored in the control TS packet in the built-in buffer of the addition control unit 54 in step S6, then the sequence proceeds to step S7, and the addition control unit 54 stores the received control TS packet in the built-in buffer and reads out the oldest control TS packet from among control TS packets stored already in the buffer (the control TS packet that has been stored first), and supplies it to the gate circuit 55, and the sequence returns to step S1. Thereby, the control TS packet stored in the buffer of the addition control unit 54 is supplied from the gate circuit 55 to the switch 31.

On the other hand, if it is determined that the control TS packet is not stored in the buffer of the addition control unit 54 in step S6, the sequence proceeds to step S8, and the addition control unit 54 supplies the received control TS packet to the gate circuit 55, and the sequence returns to step S1. Thereby, the control TS packet supplied from the input PID parser 51 is supplied from the gate circuit 55 to the switch 31.

On the other hand, if it is determined that neither the reproduced TS packet supplied from the output PID parser 52 nor the control TS packet supplied from the input PID parser 51 is received in step S1, in other words if it is determined that there is a free time space as described hereinabove, then the sequence proceeds to step S9, and whether the control TS packet is stored in the built-in buffer of the addition control unit 54 or not is determined. If it is determined that the control TS packet is not stored in the built-in buffer of the addition control unit 54, then the sequence returns to step S1, and the same processing is repeated subsequently.

If it is determined that the control TS packet is stored in the built-in buffer of the addition control unit 54 in step S9, then the sequence proceeds to step S10, and the addition control unit 54 reads out the oldest control TS packet from among control TS packets stored in the built-in buffer and supplies it to the gate circuit 55, and the sequence returns to step S1. Thereby, the control TS packet stored in the buffer of the addition control unit 54 is supplied from the gate circuit 55 to the switch 31.

The above-mentioned series of processing can be implemented not only by means of the hardware but also by means of the software. In the case that the series of processing is implemented by means of the software, a program that constitutes the software is installed in a computer or a general-purpose computer that is incorporated in a digital satellite broadcast receiving apparatus served as the exclusive hardware.

A recording medium in which the program to be installed in a computer for enabling the computer to execute the above-mentioned series of processing is recorded will be described with reference to FIG. 8A to FIG. 8C.

Figure 8A:
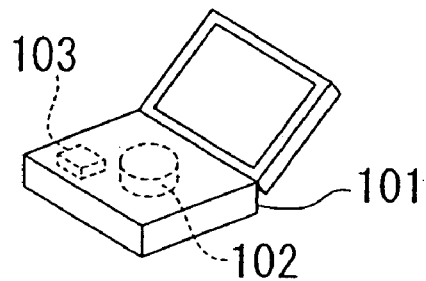
FIG. 8A to FIG. 8*c* are diagrams for describing a recording medium to which the present invention is applied.

The program may be stored previously in a hard disk 102 or semiconductor memory 103 provided as the built-in recording medium in the computer 101 as shown in FIG. 8A.

Figure 8B:
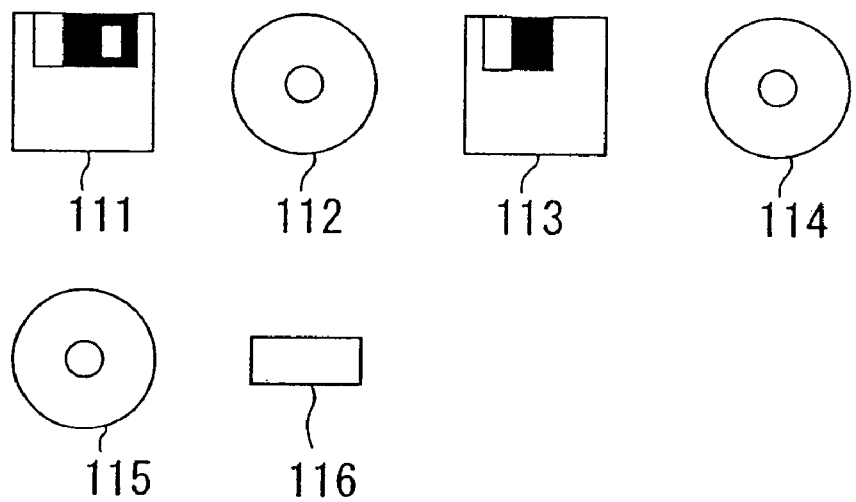

Otherwise, the program may be stored temporarily or permanently in a recording medium such as a floppy disc 111, a CD-ROM (Compact Disc Read Only Memory) 112, an MO (Magneto-optical) disc 113, a DVD (Digital Versatile Disc) 114, a magnetic disc 115, or a semiconductor memory 116 as shown in FIG. 8B. Such recording medium is provided as so-called package software.

Figure 8C:
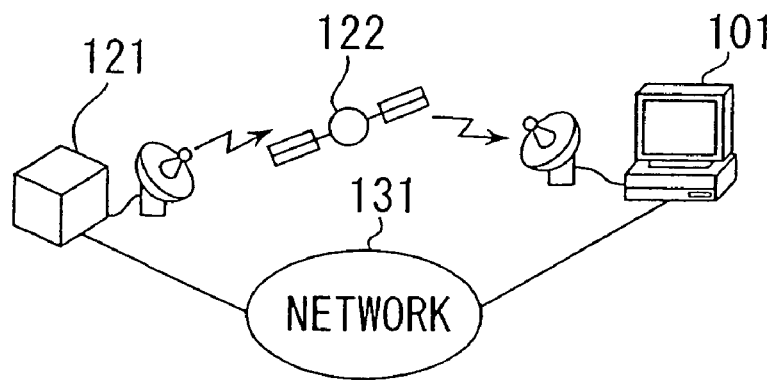

The program may be transferred wirelessly to the computer 101 from a download site 121 by way of a digital satellite broadcasting artificial satellite 122 as shown in FIG. 8C in addition to a method in which the program is installed from a recording medium as described hereinabove, and further otherwise the program may be transferred to the computer through a wire by way of LAN (Local Area Network) or a network such as the Internet and installed in the built-in hard disk 102 of the computer 101.

In the present specification, the processing step for describing the program for performing various processing by means of the computer is not necessarily implemented in the order of time series described in the flow chart, and includes parallel processing or processing to be implemented separately (for example, parallel processing or processing by means of object).

The program may be processed by means of a single computer or may be processed separately by means of a plurality of computers. Furthermore, the program may be transferred to a computer located remotely and implemented therein.

Figure 9:
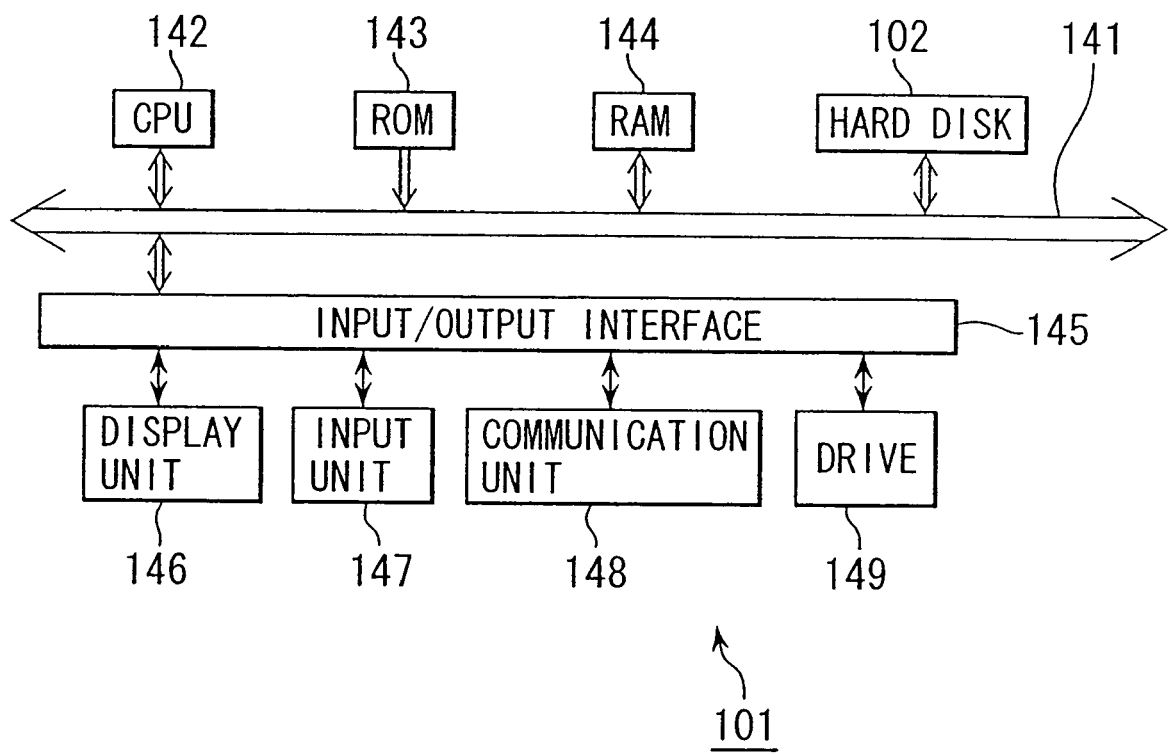
FIG. 9 is a block diagram for illustrating an exemplary structure of a computer 101 shown in FIG. 8A.

Next, FIG. 9 shows an exemplary structure of the computer 101 shown in FIG. 8A to FIG. 8C.

The computer 101 has a built-in CPU (Central Processing Unit) 142 as shown in FIG. 9. The CPU 142 is connected to the input/output interface 145 by way of the bus 141. When a user enters a command by operating an input unit 147 having a key board and mouse or the like as the component by way of the input/output interface 145, the CPU 142 loads the program stored in the ROM (Read Only Memory) 143 corresponding to the semiconductor memory 103 shown in FIG. 8A. Otherwise, the CPU 142 loads the program stored in the hard disk 102, the program that has been transferred from the satellite 122 or network 131 and received by means of the communication unit 148 and installed in the hard disk 102, or the program that has been read out from the floppy disc 111 mounted on the drive 149, the CD-ROM 112, the MO disc 113, the DVD 114, or the magnetic disc 115 and installed in the hard disk 102 on the RAM (Random Access Memory), and the CPU 142 executes the program. Then, the CPU 142 sends out the processing result to, for example, the display unit comprising a LCD (Liquid Crystal Display) or the like as required by way of the input/output interface 145.

In the present embodiment, the present invention is described in respect to the digital satellite broadcast receiving apparatus for receiving the digital satellite broadcast wave to which the present invention is applied, however, the present invention may be applied to any apparatus that receives the digital data.

In the present embodiment, the digital satellite broadcast receiving apparatus having the built-in hard disk drive 15 is described, however, the hard disk drive 15 may be of a detachable type.

In the present embodiment, in the case that the PID of the TS packet supplied from the input PID parser 51 is identical with the PID of the TS packet supplied from the output PID parser 52, the output PID parser 52 converts the PID of the TS packet that is to be sent out from the output PID parser 52 itself, however, the input PID parser 51 may converts the PID of the TS packet that is to be sent out from the input PID parser 51 itself. In other words, in the case that the PID of the TS packet that constitutes the transport stream transferred as the digital satellite broadcast program is known previously, the input PID parser 51 can convert the PID of the TS packet that constitutes the received transport stream supplied thereto so that the coincidence of PID does not occur as described hereinabove.

The transport stream described in the present specification may include not only the stream having 188 byte TS packets but also, for example, the stream or the like having 130 byte packets, which is used for DSS (Direct Satellite System) by DirecTV company in the US and decoded in the same principle as used for decoding the TS packet.

According to the data processing apparatus and data processing method, and the recording medium of the present invention, at least the first packet to be only recorded, the second packet to be recorded and to be used for controlling, and the third packet to be used only for controlling are extracted from among the packets that constitute the received stream. The first and second packets are supplied to a recording apparatus served for recording the data, and the second packet, the third packet, and the packet reproduced from the recording apparatus are multiplexed, and the multiplexed packet is sent out. As the result, it is possible to record the packet and reproduce the recorded packet simultaneously.

What is claimed is:

1. A data processing apparatus comprising:
   receiving means for receiving a first signal that includes at least first packet identification information from a remote location;
   descrambling means for descrambling said first signal;
   input packet identification parser means for extracting a packet of a first type to only be recorded, a packet of a second type to be recorded and to be used for controlling, and a packet of a third type to be used only for controlling, from among component packets of said first signal;
   first supplying means for supplying said packet of said first type and said packet of said second type to a recording unit and said packet of said second or third type to a multiplexing means;
   transmitting means for transmitting a second signal that includes at least second packet identification information from a storing means;
   output packet identification parser means for extracting a packet of a fourth type to be reproduced, and a packet of a fifth type to be discarded, from among component packets of said second signal;
   second supplying means for supplying said packet of said fourth type to said multiplexing means and discarding said packet of said fifth type; and
   converting means for converting the second packet identification information to a third packet identification information when said first and second packet identification information are the same before sending said packet of said second or third type to said multiplexing means.

2. The data processing apparatus as claimed in claim 1, wherein said input packet identification parser means includes a packet identification detecting unit, and said first supplying means comprises a first switch and a second switch.

3. The data processing apparatus as claimed in claim 2, wherein said packet identification detecting unit detects the packet identification information of said first signal and determines the type of data included in the first, second and third type packets of said first signal.

4. The data processing apparatus as claimed in claim 2, wherein said packet identification detecting unit controls said first switch and said second switch.

5. The data processing apparatus as claimed in claim 2, wherein when said first switch and said second switch are placed in an OFF state by said packet identification detecting unit, the first, second and third packets are discarded.

6. The data processing apparatus as claimed in claim 2, wherein when said first switch and said second switch are placed in an ON state by said packet identification detecting unit, said second packet is supplied to said recording unit and to said multiplexing means.

7. The data processing apparatus as claimed in claim 2, wherein when said first switch is placed in an ON state and said second switch is placed in OFF state by said packet identification detecting unit, said first packet is supplied to said recording unit.

8. The data processing apparatus as claimed in claim 2, wherein when said first switch is placed in an OFF state and said second switch is placed in ON state by said packet identification detecting unit, said third packet is supplied to said multiplexing means.

9. The data processing apparatus as claimed in claim 1, wherein said output packet identification parser means includes a packet identification detecting unit, and said second supplying means comprises a switch and a packet identification converting unit.

10. The data processing apparatus as claimed in claim 9, wherein said packet identification detecting unit detects the packet identification information of said second signal and determines the type of data included in the fourth and fifth packets of said second signal.

11. The data processing apparatus as claimed in claim 9, wherein said packet identification converting unit supplies said fourth signal to said multiplexing means.

12. The data processing apparatus as claimed in claim 9, wherein when said switch is placed in an OFF state by said packet identification detecting unit, the fifth packet is discarded.

13. The data processing apparatus as claimed in claim 9, wherein when said switch is placed in an ON state by said packet identification detecting unit, the fourth packet is provided to said packet identification converting unit.

14. A data processing method comprising:
a receiving step for receiving a first signal that includes at least first packet identification information from a remote location;
a descrambling step for descrambling said first signal;
a first extracting step for extracting a packet of a first type to only be recorded, a packet of a second type to be recorded and to be used for controlling, and a packet of a third type to be used only for controlling, from among component packets of said first signal by utilizing an input packet identification parser;
a first supplying step for supplying said packet of said first type and said packet of said second type to a recording unit and said packet of said second or third type to a multiplexing means;
a transmitting step for transmitting a second signal that includes at least second packet identification information from a storing means;
a second extracting step for extracting a packet of a fourth type to be reproduced, and a packet of a fifth type to be discarded, from among component packets of said second signal by utilizing an output packet identification parser;
a second supplying step for supplying said packet of said fourth type to said multiplexing means and discarding said packet of said fifth type; and
converting the second packet identification information to a third packet identification information when said first and second packet identification information are the same before sending said packet of said second or third type to said multiplexing means.

15. The data processing method as claimed in claim 14, wherein said input packet identification parser includes a packet identification detecting unit, and said first supplying step comprises controlling a first switch and a second switch.

16. The data processing method as claimed in claim 15, wherein said packet identification detecting unit detects the packet identification information of said first signal and determines the type of data included in the first, second and third type packets of said first signal.

17. The data processing method as claimed in claim 15, wherein said packet identification detecting unit controls said first switch and said second switch.

18. The data processing method as claimed in claim 15, wherein when said first switch and said second switch are placed in an OFF state by said packet identification detecting unit, the first, second and third packets are discarded.

19. The data processing method as claimed in claim 15, wherein when said first switch and said second switch are placed in an ON state by said packet identification detecting unit, said second packet is supplied to said recording unit and to said multiplexing means.

20. The data processing method as claimed in claim 15, wherein when said first switch is placed in an ON state and said second switch is placed in OFF state by said packet identification detecting unit, said first packet is supplied to said recording unit.

21. The data processing method as claimed in claim 15, wherein when said first switch is placed in an OFF state and said second switch is placed in ON state by said packet identification detecting unit, said third packet is supplied to said multiplexing means.

22. The data processing method as claimed in claim 14, wherein said output packet identification parser includes a packet identification detecting unit, and said second supplying step controls a switch and a packet identification converting unit.

23. The data processing method as claimed in claim 22, wherein said packet identification detecting unit detects the packet identification information of said second signal and determines the type of data included in the fourth and fifth packets of said second signal.

24. The data processing method as claimed in claim 22, wherein said packet identification converting unit supplies said fourth signal to said multiplexing means.

25. The data processing method as claimed in claim 22, wherein when said switch is placed in an OFF state by said packet identification detecting unit, the fifth packet is discarded.

26. The data processing method as claimed in claim 22, wherein when said switch is placed in an ON state by said packet identification detecting unit, the fourth packet is provided to said packet identification converting unit.

27. A data processing apparatus comprising:
receiving means for receiving a signal from a remote location;
descrambling means for descrambling said signal;
input packet identification parser means for extracting a packet of a first type to only be recorded, a packet of a second type to be recorded and to be used for controlling, and a packet of a third type to be used only for controlling, from among component packets of said signal; and
supplying means for supplying said packet of said first type and said packet of said second type to a recording unit and said packet of said second or third type to a multiplexing means;
wherein said input packet identification parser means includes a packet identification detecting unit, and said supplying means comprises a first switch and a second switch, said switches being set in accordance with a determination by said input packet identification parser means.

28. A data processing method comprising the steps of:
receiving a signal from a remote location;
descrambling said signal;
extracting a packet of a first type to only be recorded, a packet of a second type to be recorded and to be used for controlling, and a packet of a third type to be used only for controlling, from among component packets of said signal; and
supplying said packet of said first type and said packet of said second type to a recording unit and said packet of said second or third type to a multiplexing means by setting first and second switches in accordance with the type of packet that is extracted.

* * * * *